United States Patent
Ruebusch et al.

(10) Patent No.: US 9,850,998 B2
(45) Date of Patent: Dec. 26, 2017

(54) POWERED METAL VARIATOR COMPONENTS

(71) Applicant: Torotrak (Development) Limited, Leyland (GB)

(72) Inventors: Richard Ruebusch, Medina, OH (US); Adrian Lee, Samlesbury (GB)

(73) Assignee: Torotrak (Development) Limited, Leyland (GB)

( * ) Notice: Subject to any disclaimer, the term of this patent is extended or adjusted under 35 U.S.C. 154(b) by 683 days.

(21) Appl. No.: 14/323,953

(22) Filed: Jul. 3, 2014

(65) Prior Publication Data
US 2015/0011355 A1 Jan. 8, 2015

Related U.S. Application Data

(60) Division of application No. 13/443,642, filed on Apr. 10, 2012, now abandoned, which is a continuation of
(Continued)

(51) Int. Cl.
*F16H 15/40* (2006.01)
*F16H 57/04* (2010.01)
(Continued)

(52) U.S. Cl.
CPC ..... *F16H 57/0409* (2013.01); *C22C 33/0264* (2013.01); *F16H 15/40* (2013.01);
(Continued)

(58) Field of Classification Search
CPC .......... F16H 15/38; F16H 15/40; F16H 55/32; F16H 57/0409
(Continued)

(56) References Cited

U.S. PATENT DOCUMENTS

| 1,833,475 A | 11/1931 | Standish ........................ 475/216 |
| 3,574,289 A | 4/1971 | Scheiter et al. ................ 74/864 |

(Continued)

FOREIGN PATENT DOCUMENTS

| EP | 0127270 | 12/1984 |
| JP | 62-12843 | 1/1987 |

(Continued)

OTHER PUBLICATIONS

"Stackpole irons out problems," The Financial Post, Toronto, Canada, May 22, 1996.
(Continued)

*Primary Examiner* — William C Joyce
(74) *Attorney, Agent, or Firm* — Norton Rose Fulbright US LLP

(57) ABSTRACT

A variator having at least one roller which runs upon at least one race to transfer drive from one to the other at variable ratio. The variator has a fluid supply for supplying fluid to the race and roller thereby to provide a fluid film by which the roller and the race are separated in use. The roller has a running surface with root means square roughness $R_{q(roller)}$ and the race having a root means square roughness $R_{q(race)}$. The variator's specific film thickness is the minimum thickness of the fluid film in normal operation divided by the composite roughness, and is less than 1.0. At least one of the roller and the race has a powder metal surface with a Ra roughness above 0.1 micrometers.

1 Claim, 18 Drawing Sheets

Related U.S. Application Data application No. 11/626,809, filed on Jan. 24, 2007, now Pat. No. 8,152,687.

(51) Int. Cl.

| | | |
|---|---|---|
| *C22C 33/02* | (2006.01) | |
| *B22F 3/24* | (2006.01) | |
| *F16H 55/32* | (2006.01) | |

(52) U.S. Cl.
CPC ... *B22F 2003/247* (2013.01); *B22F 2003/248* (2013.01); *B22F 2998/10* (2013.01); *F16H 55/32* (2013.01); *F16H 2055/325* (2013.01); *Y10T 428/8305* (2015.04)

(58) Field of Classification Search
USPC .................................. 74/40, 42, 46, 72, 73
See application file for complete search history.

(56) References Cited

U.S. PATENT DOCUMENTS

| | | | | |
|---|---|---|---|---|
| 3,621,734 | A | 11/1971 | Bouthers et al. | 74/732.1 |
| 3,812,735 | A | 5/1974 | Von Kaler et al. | 74/371 |
| 3,915,699 | A | 10/1975 | Umehara et al. | 419/17 |
| 4,180,401 | A | 12/1979 | Frehn | 75/236 |
| 4,516,963 | A | 5/1985 | Mott | 474/245 |
| RE32,125 | E | 4/1986 | Von Kaler et al. | 74/371 |
| 4,874,439 | A | 10/1989 | Akutsu | 148/433 |
| 4,943,321 | A | 7/1990 | Akutsu | 75/243 |
| 4,966,626 | A | 10/1990 | Fujiki et al. | 75/238 |
| 5,085,792 | A | 2/1992 | Narihiko et al. | 252/79 |
| 5,108,491 | A | 4/1992 | Matsumoto et al. | 75/242 |
| 5,344,577 | A | 9/1994 | Deckman et al. | 508/569 |
| 5,459,766 | A | 10/1995 | Huizer et al. | 375/376 |
| 5,516,483 | A | 5/1996 | Shivanath et al. | 419/14 |
| 5,560,787 | A | 10/1996 | Takagi et al. | 148/319 |
| 5,659,955 | A | 8/1997 | Plamper | 29/893.32 |
| 5,820,510 | A | 10/1998 | Ueda et al. | 475/210 |
| 5,820,704 | A | 10/1998 | Veyer et al. | 148/610 |
| 5,842,945 | A | 12/1998 | Inoue | 475/207 |
| 5,900,559 | A | 5/1999 | Nakamura et al. | 75/232 |
| 6,147,867 | A | 11/2000 | Gaudrel et al. | 361/707 |
| 6,342,109 | B1 | 1/2002 | Takemura et al. | 148/319 |
| 6,432,009 | B1 | 8/2002 | Hansen et al. | 474/49 |
| 6,475,309 | B1 | 11/2002 | Fogelstrom et al. | 148/589 |
| 6,524,212 | B2 * | 2/2003 | Ushijima | F16H 15/38 476/40 |
| 6,607,693 | B1 | 8/2003 | Saito et al. | 420/417 |
| 6,918,835 | B2 | 7/2005 | Aoki et al. | 464/32 |
| 7,018,107 | B2 | 3/2006 | Beswick et al. | 384/565 |
| 7,160,351 | B2 | 1/2007 | Trasorras et al. | 75/246 |
| 7,488,270 | B2 | 2/2009 | Harada et al. | 476/73 |
| 2002/0170799 | A1 | 11/2002 | Miller | 192/217 |
| 2003/0176152 | A1 | 9/2003 | Lugt et al. | 451/57 |
| 2004/0013558 | A1 | 1/2004 | Kondoh et al. | 419/36 |
| 2004/0071378 | A1 | 4/2004 | Beswick et al. | 384/492 |
| 2004/0115083 | A1 | 6/2004 | Furuta et al. | 419/28 |
| 2005/0066758 | A1 | 3/2005 | Marcell et al. | 74/425 |
| 2008/0264524 | A1 | 10/2008 | Maruta et al. | 148/330 |

FOREIGN PATENT DOCUMENTS

| | | |
|---|---|---|
| WO | WO/00/077268 | 12/2000 |
| WO | WO/00/079151 | 12/2000 |
| WO | WO/01/027609 | 4/2001 |
| WO | WO/2006/084905 | 8/2006 |
| WO | WO/2009/137719 | 11/2009 |

OTHER PUBLICATIONS

Lee and Newall, "Developing the Durability of a Dual-Cavity Full-Toroidal IVT Variator," Torotrak (Development) Ltd, Yoshihiro Ono, Teruo Hoshino: Koyo Seiko Co Ltd, SAE 2002 World Congress & Exhibition, Detroit: Session: Transmission and Driveline Systems Symposium (Part A)—IVT/CVT; Document No. 2002-01-0587, Book No. SP-1655, Mar. 2002.

PCT International Search Report and Written Opinion, issued in International Application No. PCT/US 08/51904, dated Aug. 4, 2008.

Office Action for U.S. Appl. No. 11/626,809, dated Oct. 7, 2009.

Response to Oct. 7, 2009 Office Action in U.S. Appl. No. 11/626,809, dated Mar. 8, 2010.

Office Action for U.S. Appl. No. 11/626,809, dated Jun. 2, 2010.

Response to Jun. 2, 2010 Office Action in U.S. Appl. No. 11/626,809, dated Dec. 2, 2010.

Office Action for U.S. Appl. No. 11/626,809, dated Feb. 18, 2011.

Response to Feb. 18, 2011 Office Action in U.S. Appl. No. 11/626,809, dated Feb. 18, 2011.

Notice of Allowance in U.S. Appl. No. 11/626,809, dated Dec. 5, 2011.

Office Action for U.S. Appl. No. 13/443,642, dated Jan. 3, 2014.

\* cited by examiner

POWERED METAL VARIATOR COMPONENTS

CROSS-REFERENCES TO RELATED APPLICATION(S)

This is a divisional of co-pending U.S. application Ser. No. 13/443,642, filed Apr. 10, 2012, which is a continuation of U.S. application Ser. No. 11/626,809, now U.S. Pat. No. 8,152,687, filed Jan. 24, 2007, which is incorporated by reference in its entirety.

FIELD OF THE INVENTION

The present invention relates to variators of rolling traction type having component parts made using powdered metallurgy. In particular, the invention relates to powder metal variator components with a morphology that resists spalling and related component failure.

BACKGROUND OF THE INVENTION

A "variator" is a device for transmitting rotary drive at a continuously variable ratio. Variators are used for example in continuously and infinitely variable transmissions for vehicles.

In a rolling traction type variator, drive is transmitted between rotating parts by virtue of traction at a rolling contact between them, and movement of one or more of the rotating parts provides for change in the variator drive ratio. The variator typically includes a first rotating part—a race—upon which runs a second rolling part—a roller.

The rollers and races can take various forms. Some rolling traction variators have conical races, movable along their axial direction to change ratio, with a wheel between them to transmit drive from one to the other. Another example uses spherical rollers rotatably mounted upon respective shafts. An example of this type is provided in U.S. patent application Ser. No. 10/141,652, published under US2002/0170799 and filed in the name of Donald C Miller.

A well known variator is the toroidal race type which comprises at least one pair of semi-toroidally recessed variator races mounted for rotation about a common axis and defining between themselves a generally toroidal cavity. The construction and operation of such variators is described in patents and patent applications held by Torotrak (Development) Ltd and others, including for example Torotrak's International Patent Application PCT/EP2006/)50860, published under no. WO2006/084905, the content of which is incorporated by reference.

In most cases rolling parts must be biased toward one another to provide traction. An important quantity in this regard is the traction coefficient $\mu$, defined in the conventional manner as traction force divided by contact normal force, where the traction force is the force transmitted at the rolling contact and the contact normal force is the force with which the rolling parts are biased together, measured normal to the contact surfaces.

The rollers and races may be in direct mechanical contact, with drive being transmitted from one to the other through friction at the contact. Other rollers and races may be separated by a thin film of fluid ("variator fluid"). The variator fluid is typically jetted onto the rolling parts, and thus drawn into the region between them.

In a toroidal type variator, the contact normal force is typically provided by biasing one of the variator races toward the other. The force applied to the variator race (which determines the contact normal force but is not equal to it, since it is shared over multiple variator rollers and is not in general precisely parallel to the contact normal) is referred to as the "end load". Some sophisticated variators use a hydraulic actuator to provide an end load which varies with the torque being handled by the variator. Some simple variators use a spring to provide a substantially constant end load. PCT/EP2006/050860, referred to above, provides an example of the latter.

There is a limit to the traction coefficient that can be sustained. If the required traction force becomes excessive in relation to the contact normal force, the result is an unacceptable degree of slippage at the rolling contact, which can result in damage to the variator. The limiting coefficient of traction—at which slippage becomes unacceptable—may depend upon several factors including, for example, the nature of the surfaces of the rolling parts and the elastohydrodynamic properties of the variator fluid, where present. A high value of the limiting coefficient of traction is desirable because it allows for a reduction in the end load. High end loads can reduce the variator's efficiency and reduce the effective life of the component parts especially the races and rollers.

The variator's rollers and races can cyclically suffer high Hertzian contact pressure. Also significant heat can be dissipated, creating potentially high temperatures. There may also be large tangential shear forces at their surface. These factors can lead to failure of the rollers and races, as explained in a paper entitled "Developing the Durability of a Dual-Cavity Full-Toroidal IVT Variator" (Adrian Lee, Jonathan Paul Newall: Torotrak (Development) Ltd, Yoshihiro Ono, Teruo Hoshino Koyo Seiko Co Ltd, SAE 2002 World Congress & Exhibition, March 2002, Detroit: Session: "Transmission and Driveline Systems Symposium (Part A)—IVT/CVT; Document Number 2002-01-0587, Book Number SP-1655). (Referred to as "Durability Paper").

The Durability Paper describes a prior study of the factors affecting the fatigue life of the variator rollers and races. The rolling parts tested were wrought bearing steel with surfaces that were either ground or lapped. The paper explains that some of these parts underwent rolling contact fatigue, exhibited in two failure modes:

1. surface distress—"failure of rolling elements by the formation of glazed areas, followed by asperity scale microcracks which lead to asperity scale micro-spall craters"; and 2. spalling—"failure by the formation of macroscopic craters in the contact surface as a result of fatigue crack propagation in the Hertzian stress field" (the words in quotation marks are taken directly from the paper).

Both rendered the components unfit. The irregular running surfaces caused by surface distress were observed to lead to unacceptable vibration in the variator. In the trials described in the paper, testing was terminated at that point, but other trials have demonstrated that a bearing steel component which continues to be used after the onset of surface distress will suffer spalling.

Where surface distress did not occur (i.e., where the components functioned correctly, without failure) wear rate of the rolling surfaces of the rollers and races was so low as to make its assessment by the conventional method—measurement of weight loss—impractical. This of course is the result of the separation of the surfaces by the fluid film. A related observation (not detailed in the paper but demonstrated in other trials) is that variator rollers and races which have completed their design lifetime and even been tested to the point of destruction have often undergone so little wear as to retain upon their running surfaces the slight machining marks left by turning or grinding during their manufacture.

The study involved components with relatively rough running surfaces (0.13<Ra<0.23) and smoother components (Ra<0.1). The surface distress failure mode was observed only in the relatively rough components, whose lifetime was also shorter than the smoother parts. The Durability Paper implies that running surfaces need to be sufficiently smooth to prevent surface distress.

Variator's rolling parts are typically made as smooth as commercially possible to resist surface distress. The Durability Paper contained proposed alloys and surface treatments intended to provide compressive residual stress at the roller surface, to resist surface initiated cracking.

FIG. 6 to this application (not taken from the Durability Paper) is a micrograph showing the running surface of a wrought steel variator component made with roughness 0.13<Ra<0.23 that failed after being run for 74 hours at 1.8 GPa. Region 1000 shows the effects of surface distress. The surface distress has led to surface initiated spalling, forming a crater 1002. Bands 1004 and 1006 on either side of the running track are unaffected.

On the other hand, FIG. 7 to this application is a micrograph showing the running surface of a component having a surface roughness Ra<0.1, which ran for more than 2200 hours at the same pressure: 1.8 GPa. It can be seen that the region 1008, forming the centre of the running track, still shows the original machining features also seen in bands 1010, 1012 to either side of the track. Imperfection 1013 is the imprint of some debris. In peripheral running track regions 1014, 1016, in which film thickness was lowest, the material has been polished, its asperities having been being plastically deformed or smoothed in use.

Running surface properties, such as roughness, have a bearing on variator performance including the peak or limiting traction coefficient. While factors, such as choice of variator fluid can influence the limiting traction coefficient, it is believed that a suitable degree of roughness can assist in providing traction. However, increased roughness when using the conventional wrought steel parts appears to lead to premature fatigue failure.

International patent application PCT/NL00/00418, published under no. WO 00/77268 in the name of SKF Engineering and Research Centre B.V ("SKF") discloses high alloy steel variator discs and/or rollers formed using then existing powder metallurgy manufacturing methods.

SKF states that "any method known in the art" may be used and identifies hot isostatic pressing followed by hot forging as a method of making the powdered metal. Hot isostatic pressing was a well known technique for forming high quality steel, involving the application of heat and high pressures to metal particles in a closed capsule, to create a very dense ingot without many internal voids.

The SKF surfaces are to be treated to achieve "a very high hardness", by austenising and then quenching. The resulting component is said to have a very high surface hardness. For instance, the surface hardness was measured at 67 HRc. Somewhat similar content is found in SKF's International patent application PCT/NL00/00417, published under WO 00/79151.

SUMMARY OF THE INVENTION

The present invention involves powder metal variator components including races, rollers and other variator parts that differ from SKF. It is believed that such powder metal components are sufficiently durable for use in variators. Moreover, these parts can be effective when used with ordinary mineral based variator fluids.

By way of example only, embodiments of the present invention are described in the DETAILED DESCRIPTION OF THE DRAWINGS.

DETAILED DESCRIPTION OF THE DRAWINGS

The Variator

The variator described below and the variator components tested and described below serve by way of example only. This application is not limited to toroidal race type variators, but extends to other variators. Nor is this application limited to rollers and races. Other transmission components, such as the epicyclic gearing may be made of powder metal.

Figure 1:
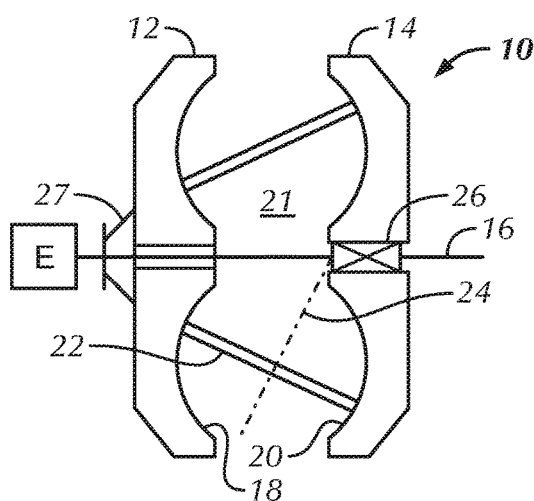
FIG. 1 is a schematic representation of a toroidal race, rolling traction type variator, viewed in a sectional plane containing the variator's axis.

FIG. 1 is a schematic representation of a variator of toroidal race, rolling traction type. The general construction of such variators is well known to the skilled person and described in patents and patent applications held by Torotrak (Development) Limited, including WO2006/084905A1, which is incorporated by reference. Other IVT disclosures are available at www.torotrak.com.

The variator 10 has a pair of variator races 12, 14 mounted for rotation about a common axis defined by a shaft 16. Both races are semi-toroidally recessed as seen at 18 and 20 so that together they define a generally toroidal cavity 21 containing a set of rollers 22. Each roller 22 is mounted for rotation about its own axis 24 and each runs upon the recessed faces 18, 20 of both variator races 12, 14 to transfer drive between them.

Variator race 12 is coupled to the shaft 16 through splines, so that it rotates along with the shaft, and is driven by a rotary power source such as an engine E which is itself operatively coupled to the shaft. Variator race 14 is mounted on a bearing 26 co-axial with the shaft 16 and so is able to rotate independently of it, and is coupled to downstream gearing.

In the case of a motor vehicle transmission, this gearing is typically of epicyclic type and leads to the driven vehicle wheels. Suitable epicyclic gear arrangements are well known in the art. PCT/EP2006/050860 provides one example and is incorporated by reference. The splined mounting of variator race 12 allows it to move somewhat along the shaft, and a spring 27, formed in this embodiment as a Belleville washer, urges that race toward its fellow to provide the end load. The mountings of the rollers allow them to undergo a tilting motion to change the angle between the roller axis 24 and the shaft 16, changing the variator ratio in a manner very well known in the art.

Powder Metal Test Parts

Variator rollers and races were produced according to the following process by Hawk Precision Components, which is presented by way of example and not limitation. Powdered metal was placed into compaction tooling generally conforming to the component's shape. The powder in the compaction tooling is then subject to high velocity compaction to create a green compacted component. The Part is then sintered and subject to further processing by High Velocity re-strike. The parts are then heat treated and machined. Textured tooling created the surface used to form the races.

The tested rollers and discs comprised low alloy steel formed using powder metallurgy with one set having 0.3% carbon chromium (C—Cr) steel and another having 0.6% C—Cr steel. The roller contact surfaces were machined to shape while the discs' contact surfaces were not machined. The rollers and discs had a density of between 7.1-7.6 grams (g)/cubic centimeter (cc). The parts had a hardness between 54 and 62 HRc.

Morphology

The resulting variator component morphology includes internal spaces, voids or cavities. It is believed that this morphology helps render the powdered metal variator components acceptable for use in variators. FIGS. 3A-3M are photomicrographs of rollers and discs described below. These figures show the morphology of parts at various stages of testing.

FIGS. 3A-3F are 250× photomicrographs of the race/disc surface of the net shape (unimproved) PM component after approximately 100 hours of use. The surface has a planished smooth but with an amorphous microstructure. It appears that the disc contact surface continues to renew itself over the service life by micro-pitting and does not exhibit failure due to spalling or fatigue.

These figures disclose random voids within the microstructure. This non-homogeneous random microstructure does not appear to degrade as discovered in similar wrought or forged materials. The randomly distributed voids, asperity peaks and valleys in the powdered metallurgy morphology appear to provide improved traction while still providing a durability not believe obtainable in dense wrought and forged materials.

FIGS. 3G-3J are the same plane of view and features as FIGS. 3A-3F but at a higher magnification (1000×).

Figure 3A:
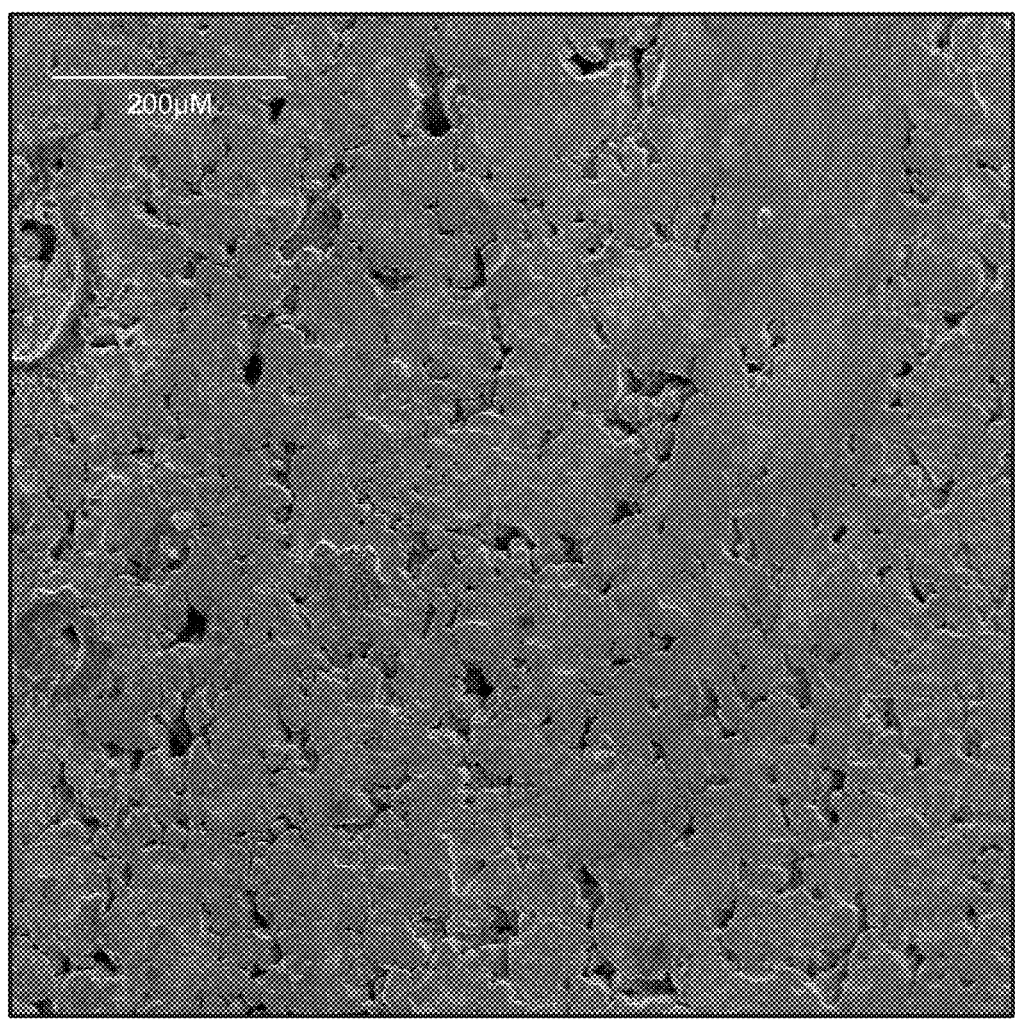
FIGS. 3A-3M are photomicrographs of the traction tested powder metal discs and rollers.
Figure 3B:
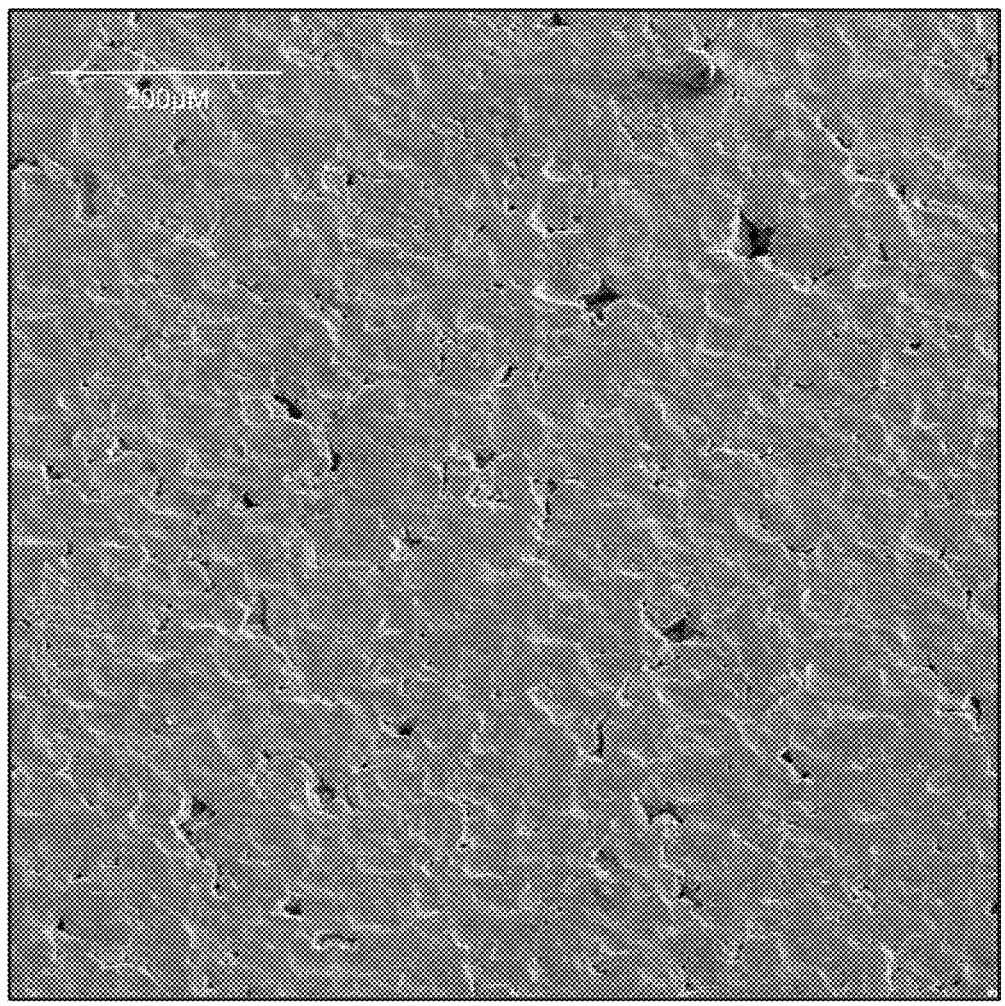
Figure 3C:
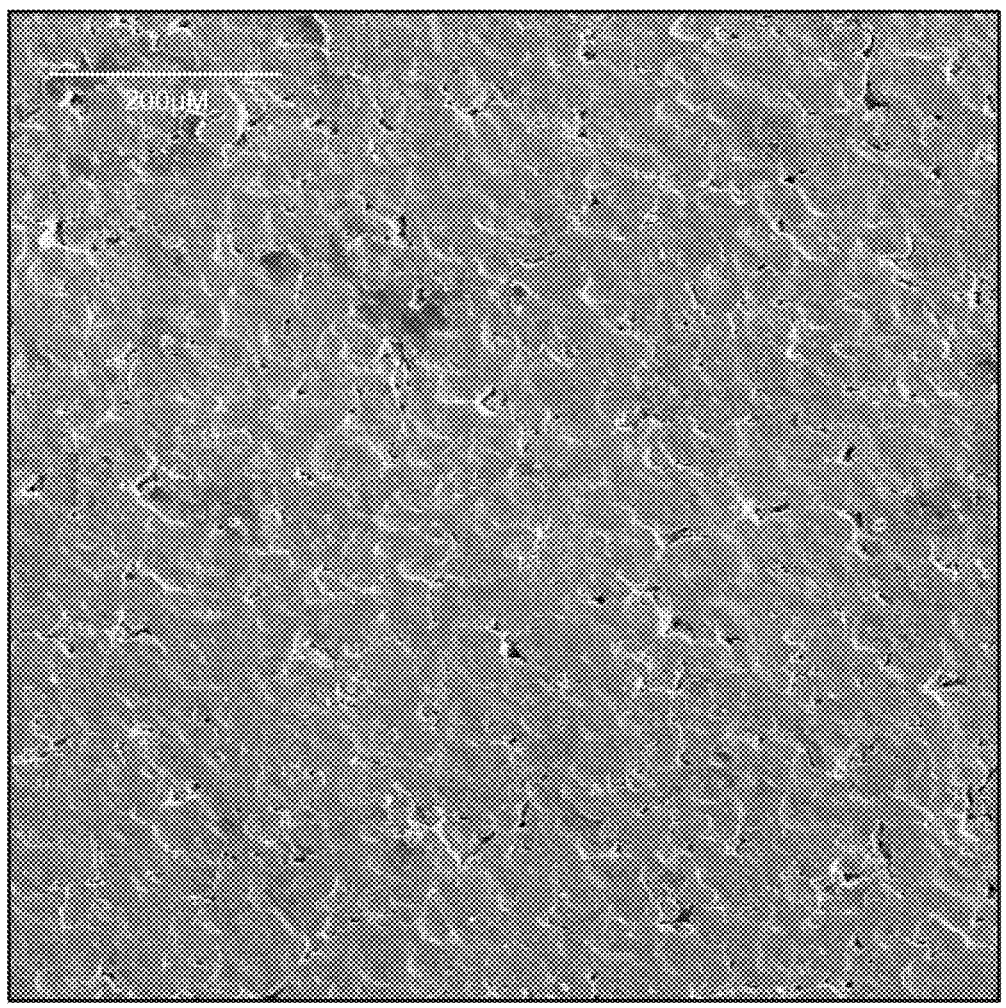
Figure 3D:
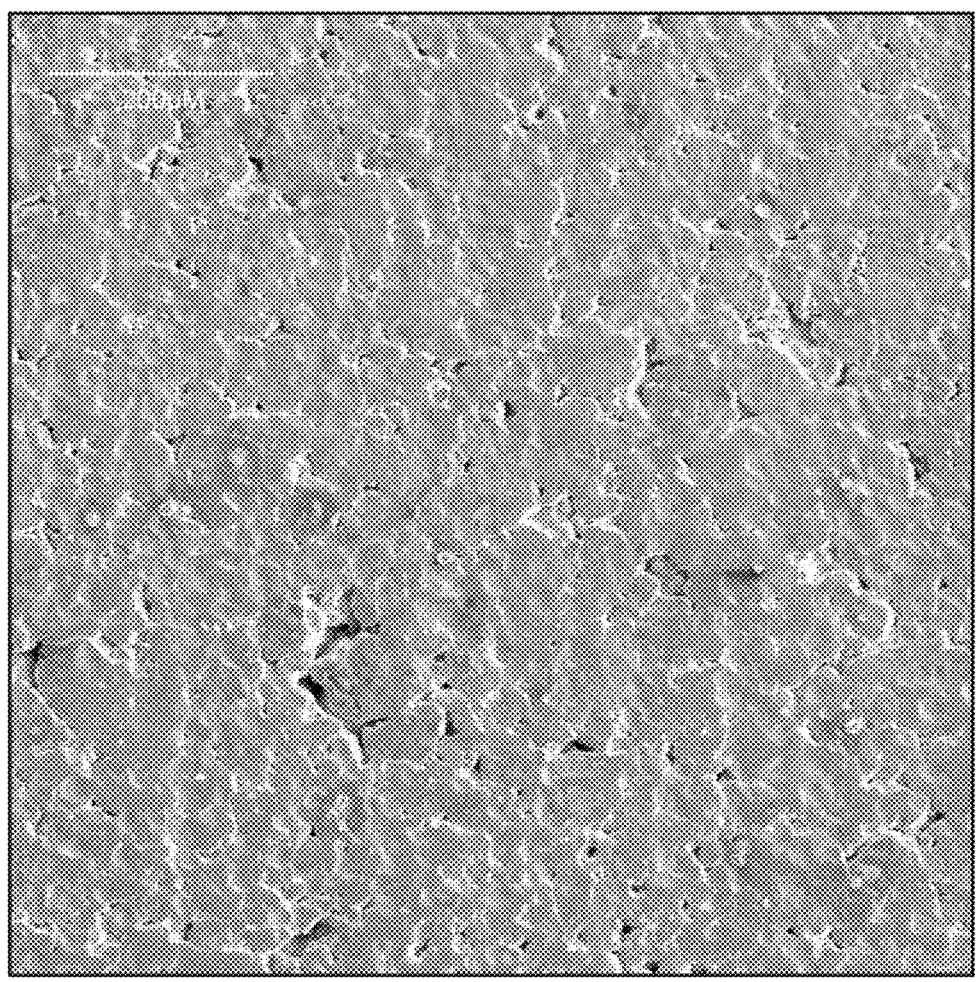
Figure 3E:
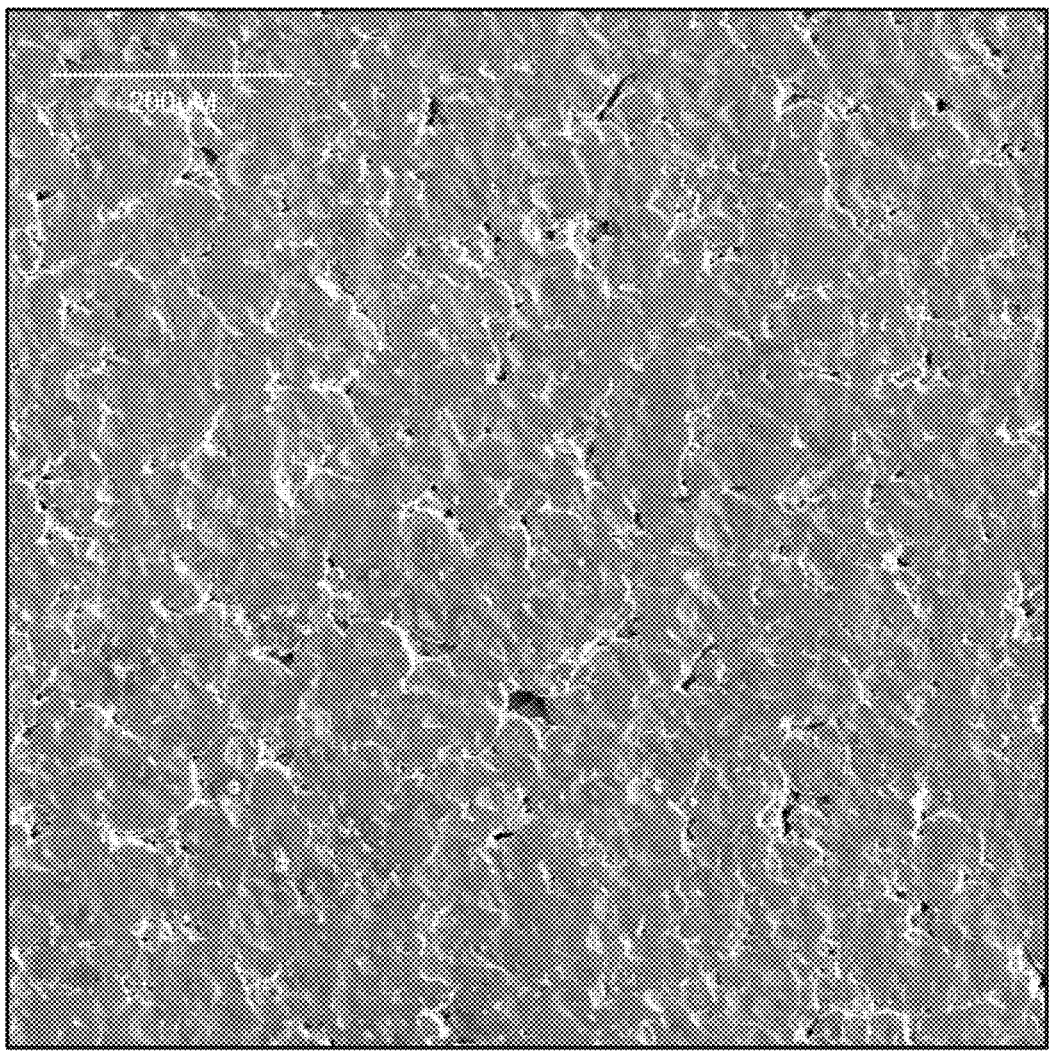
Figure 3F:
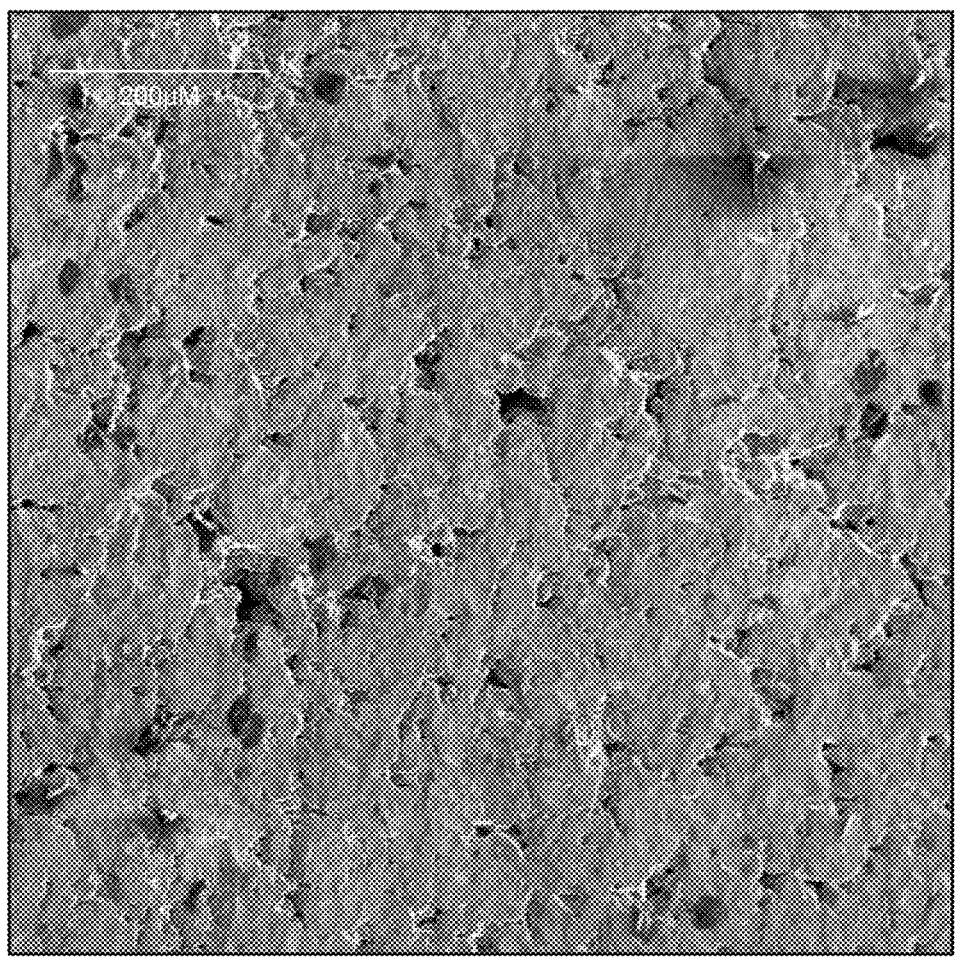
Figure 3G:
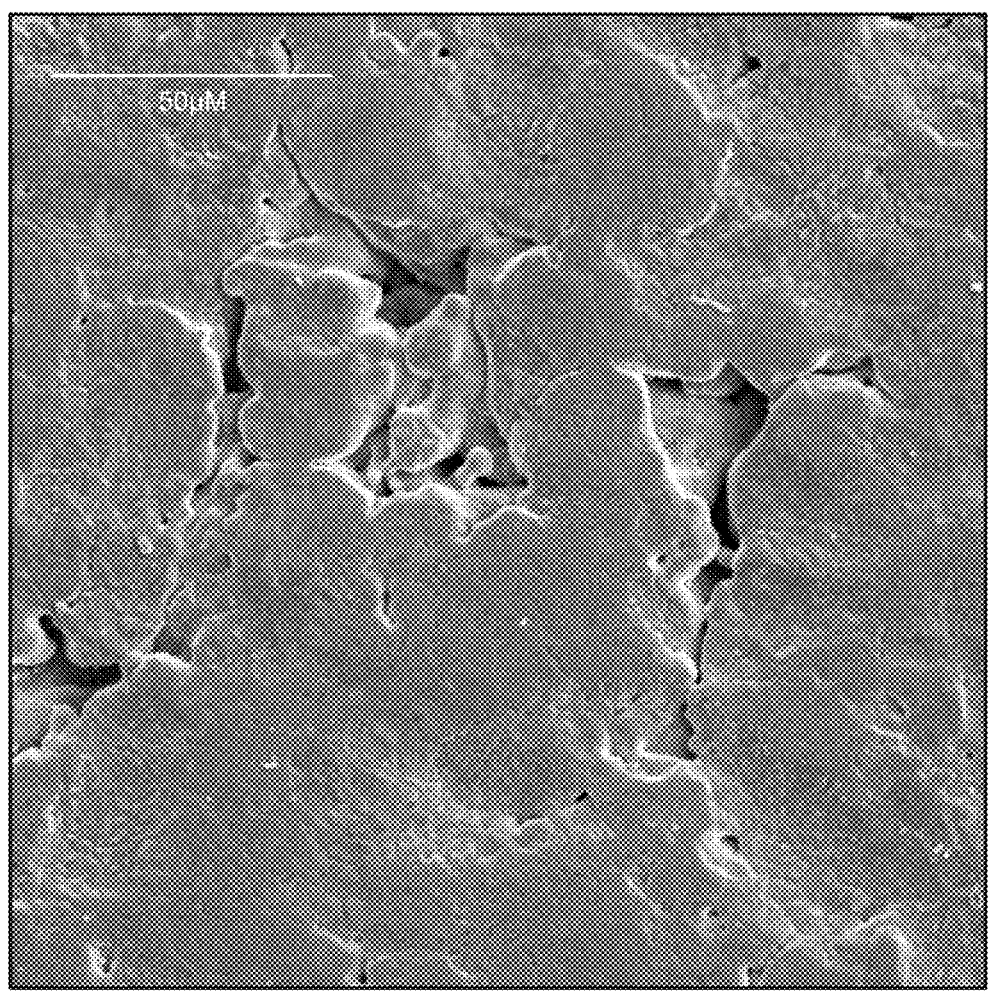
Figure 3H:
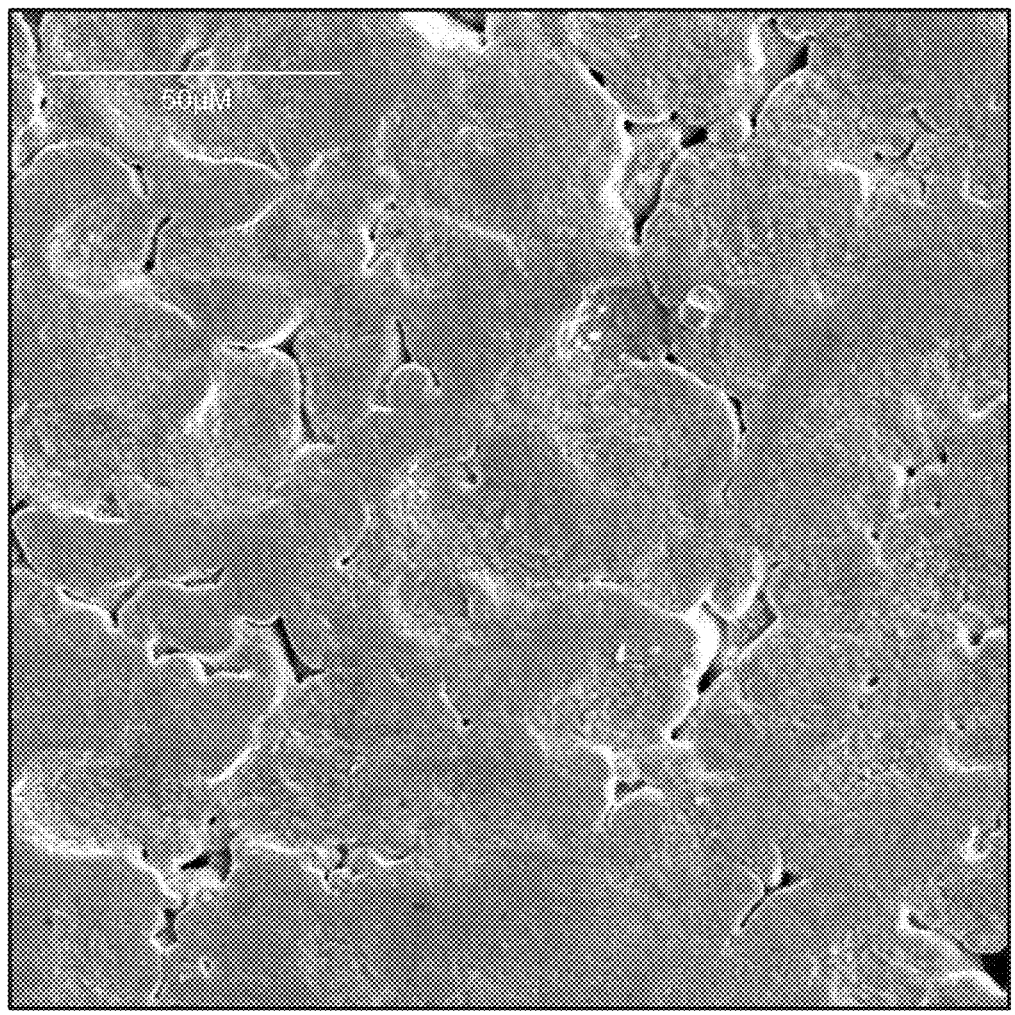
Figure 3I:
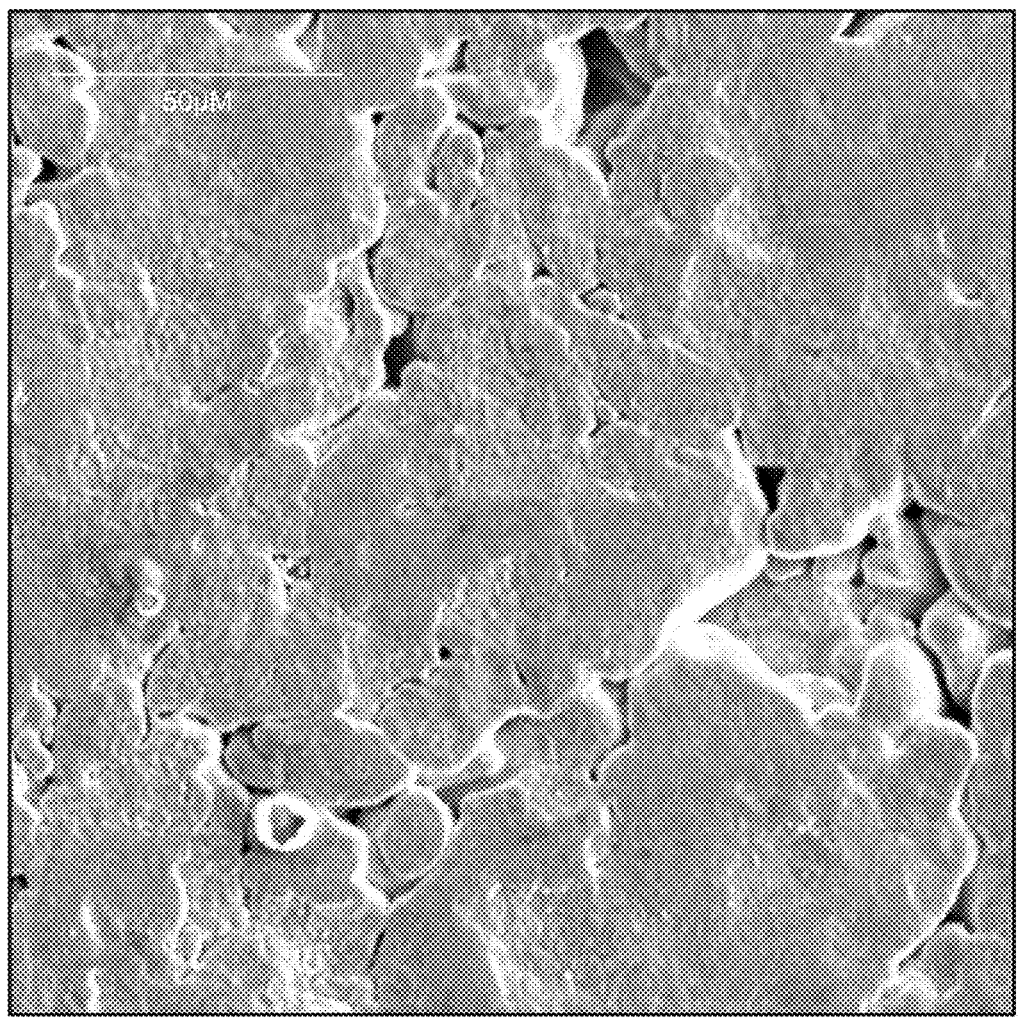
Figure 3J:
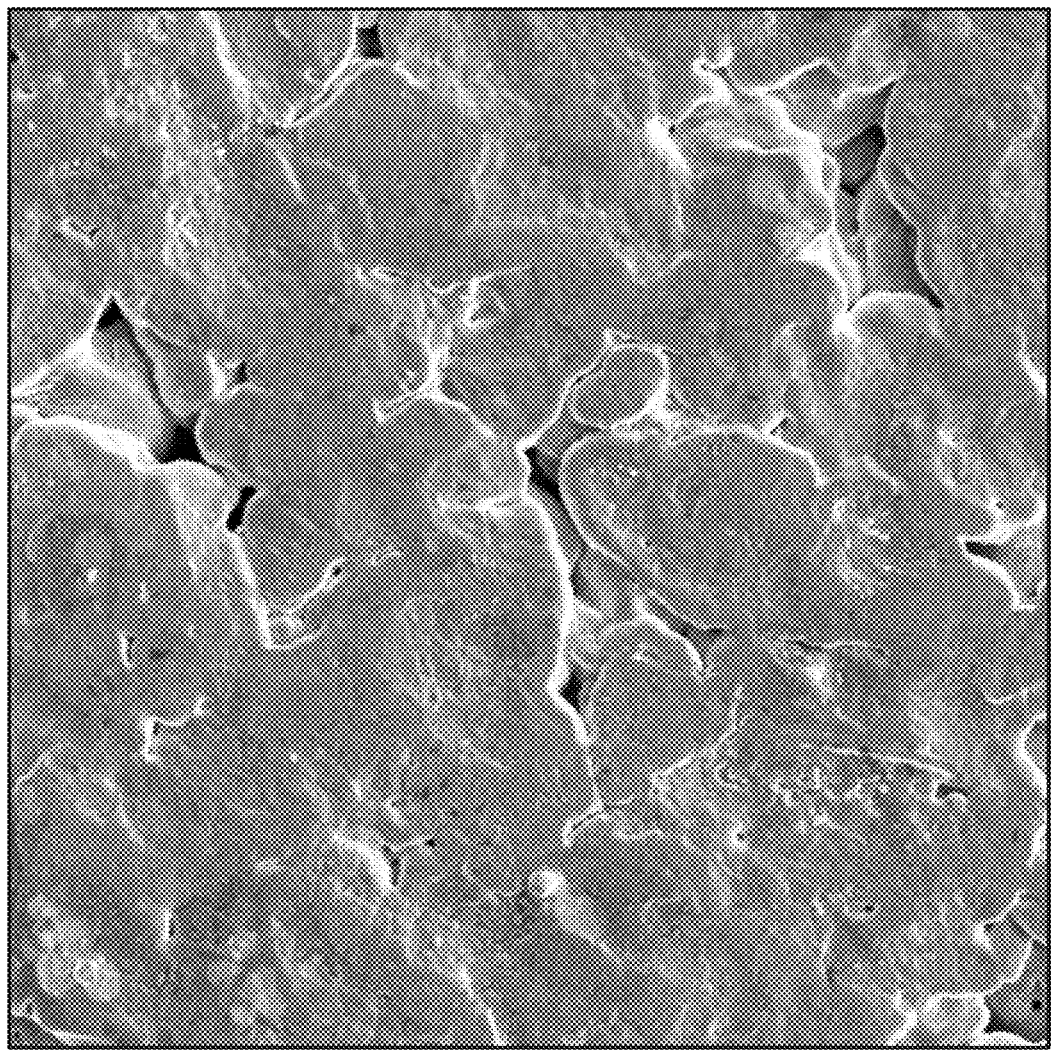
Figure 3K:
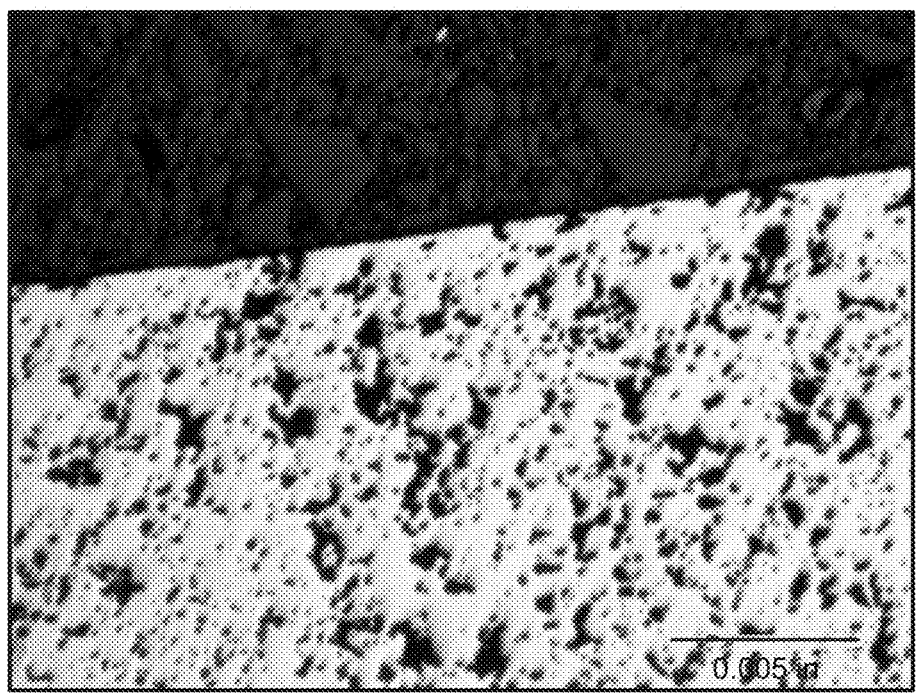
Figure 3L:
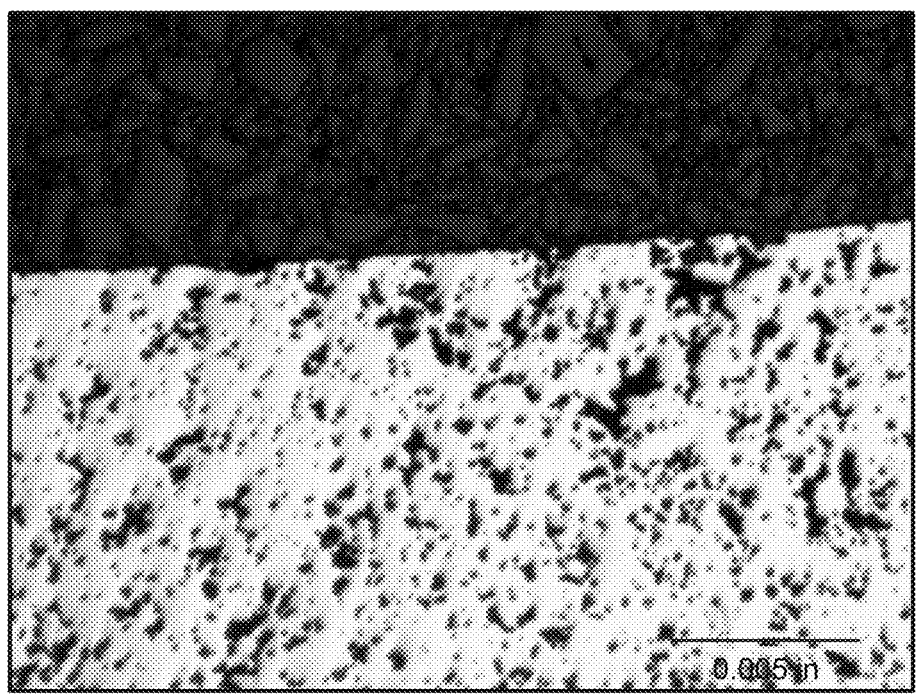
Figure 3M:
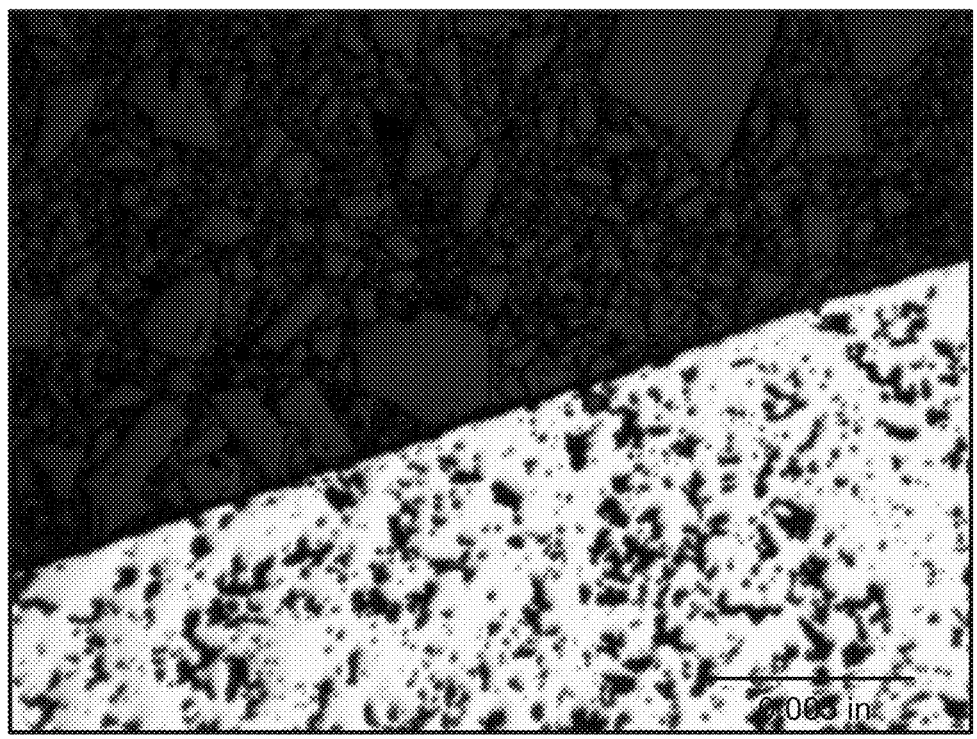

FIGS. 3K-3M are 250× cross sectional photomicrographs that show the substructure morphologies. The morphology is planished or dandified but without a fully coherent surface band with a depth of 0.012 inches-0.020 inches. This amorphous substructure includes passageways. It is believed that these may play a role in the transfer of fraction fluids between the discs and rollers. As such, the hydroelastic traction drive lubricating and cooling fluid may be supplied using these powdered metal components by 2 interfaces—one in the subsurface and one at the surface.

Testing

The powder metal races/discs and rollers were tested for peak traction coefficient, roughness, hardness and durability under the various conditions described below. The races/discs and rollers were tested using prototype variators and a test rig capable of running variator components under adjustable speed and load conditions. The test rig is described in International patent application PCT/GB00/03904, published under WO01/27609 by Torotrak, which application is incorporated by reference.

Traction

Measurements were made of traction data for the test parts using the test rig. The trials were carried out using (a) conventional wrought steel rollers and races, formed of an alloy referred to as "Ovako 825" and having a high surface finish with roughness Ra of nominally 0.02 micrometers; (b) powder metal rollers and races formed of a steel alloy having 0.3% C—Cr steel, roller roughness Ra=1.02 micrometers and race roughness Ra=0.58 micrometers; and (c) powder metal rollers formed of a steel alloy having 0.6% C—Cr steel, a roller roughness Ra=1.53 micrometers and race roughness 1.12 micrometers. The trial was carried out using both high performance fraction fluid and an automotive automatic transmission fluid (ATF). Results were as follows.

| Contact Conditions Trials conducted using high performance traction fluid | | | Peak Traction Coefficient (average value from tests in both directions) | | |
| --- | --- | --- | --- | --- | --- |
| Load (and Approx. Mean Hertzian Contact Stress) | Fluid Temp | Rolling Speed | Baseline Ovako 825 | Set 1 0.3% C Chromium Steel | Set 2 0.6% C Chromium Steel |
| 607N (0.69 GPa) | 90° C. | 4 m/s | 0.082 | 0.094 | 0.098 |
| 607N (0.69 GPa) | 90° C. | 11 m/s | 0.078 | 0.086 | 0.093 |
| 607N (0.69 GPa) | 90° C. | 18 m/s | 0.073 | 0.082 | 0.088 |
| 2865N (1.16 GPa) | 90° C. | 4 m/s | 0.087 | 0.090 | 0.092 |
| 2865N (1.16 GPa) | 90° C. | 11 m/s | 0.08 | 0.083 | 0.087 |
| 2865N (1.16 GPa) | 90° C. | 18 m/s | 0.074 | 0.077 | 0.081 |

| Contact Conditions Trials conducted using ATF | | | | Peak Traction Coefficient (average value from tests in both directions) | |
|---|---|---|---|---|---|
| Load (and Approx. Mean Hertzian Contact Stress) | Fluid Temp | Rolling Speed | Baseline Ovako 825 | Set 1 0.3% C Chromium Steel | Set 2 0.6% C Chromium Steel |
| 607N (0.69 GPa) | 90° C. | 4 m/s | 0.028 | 0.070 | 0.075 |
| 607N (0.69 GPa) | 90° C. | 11 m/s | 0.024 | 0.057 | 0.066 |
| 607N (0.69 GPa) | 90° C. | 18 m/s | 0.023 | 0.055 | 0.059 |
| 2865N (1.16 GPa) | 90° C. | 4 m/s | 0.040 | 0.067 | 0.058 |
| 2865N (1.16 GPa) | 90° C. | 11 m/s | 0.034 | 0.060 | 0.048 |
| 2865N (1.16 GPa) | 90° C. | 18 m/s | 0.032 | 0.056 | 0.045 |

The first chart shows that all the components had an acceptable traction coefficient using the synthetic traction/variator fluid. The powdered metal parts had greater tractions coefficients than the bearing steel parts where the 0.6% C—Cr steel parts performed best overall.

The second chart shows that the bearing steel parts had a lower traction coefficient when used in conjunction with the ATF. The powdered metal test parts had acceptable traction. Some of the 0.3% C—Cr steel parts were found to suffer from deleterious surface distress and consequent failure. Subsequent traction trials have used 0.6% C—Cr steel.

Figure 2:
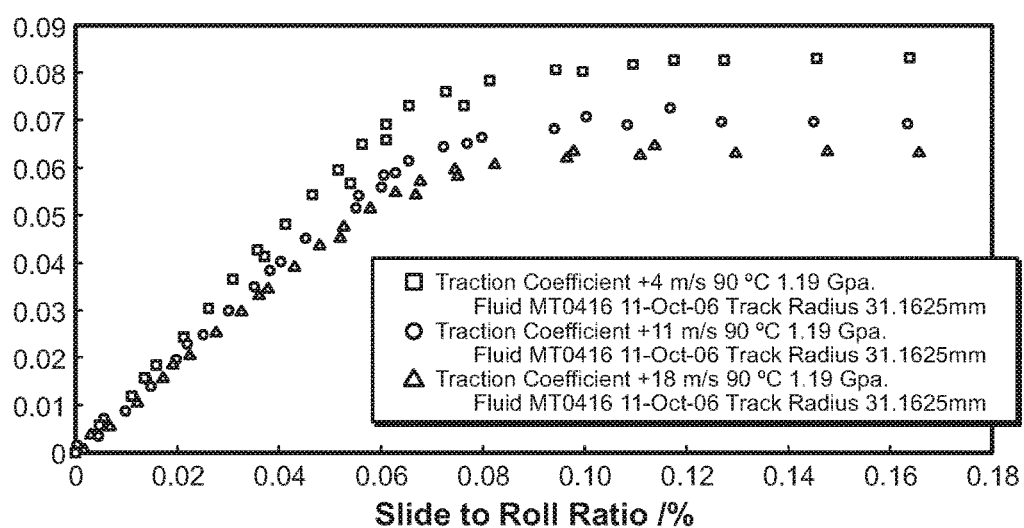
FIG. 2 is a Traction Coefficient Graph of the tested powder metal discs and rollers.

FIG. 2 is a graph of the Slide to Roll Ratio percentage from running powder metal test parts in a prototype variator at 3 different speeds, using blended traction fluids. Traction coefficient is on the vertical axis. Slide to roll ratio, expressed as a percentage, is on the horizontal axis and serves as an indication of the degree of slip at the roller/race contact. All three data sets show asymptotic behaviour around a certain traction coefficients, with slide to roll ratio increasing very rapidly—the level at which this happens can be taken to be the limiting traction coefficient.

Figure 8:
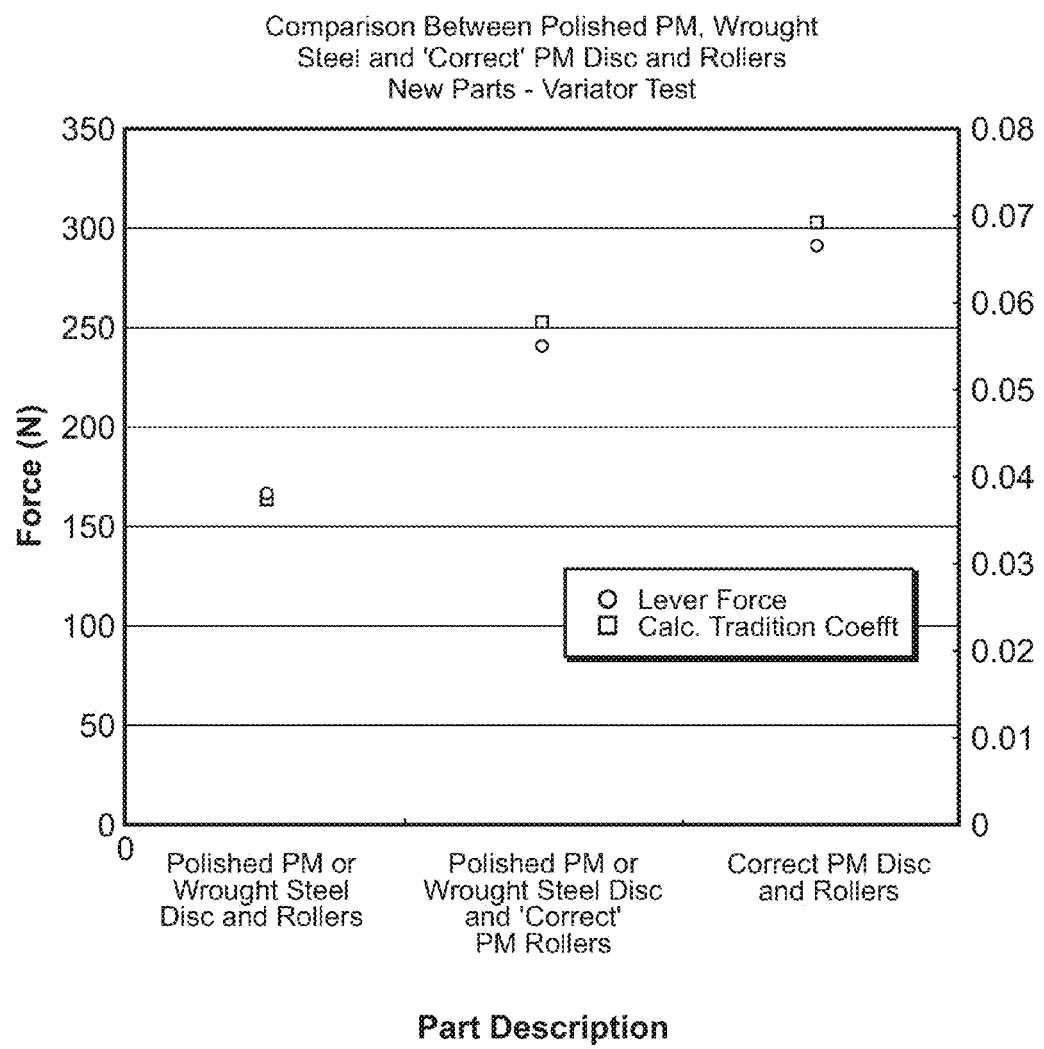
FIG. 8 shows lever force and traction coefficient values for three different types of variator component.
Figure 9:
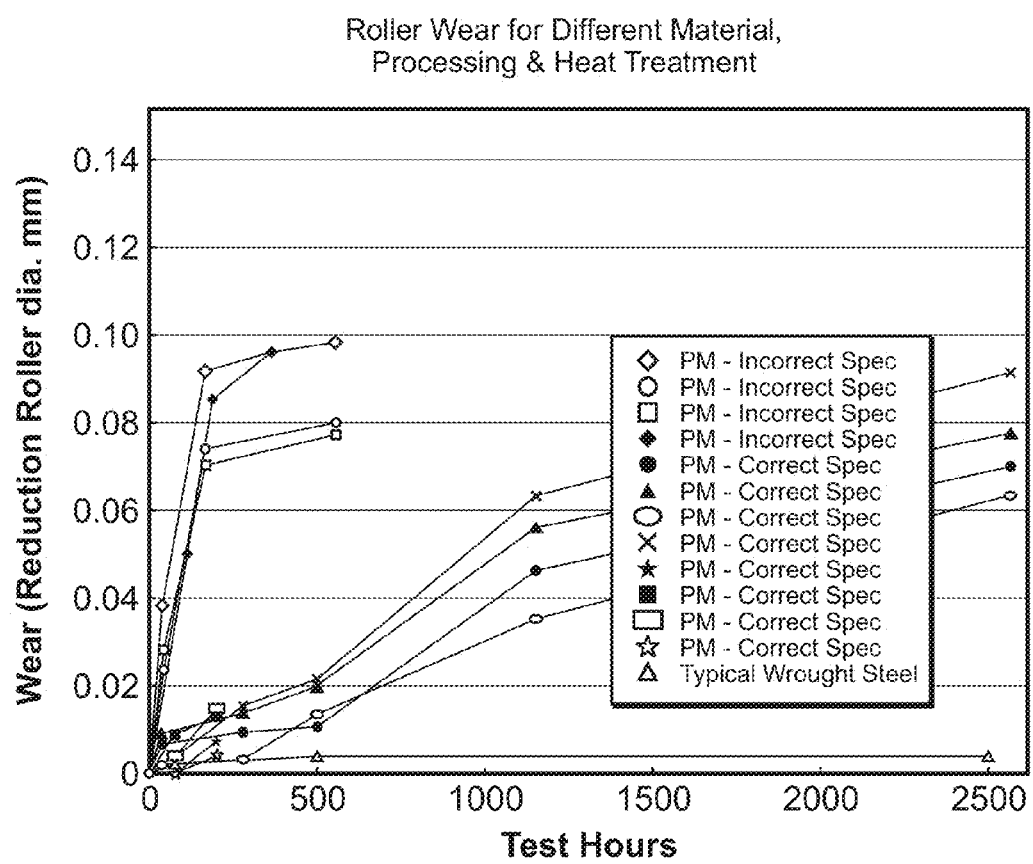
FIG. 9 is a graph showing the rate of wear of various variator rollers.

FIG. 8 shows the results of testing of certain parts in a transmission. A test variator was driven on its input side by a motor at a fixed speed. The transmission's output was fixed—i.e., stationary—so that the variator could not depart from the geared neutral ratio. The contact normal force in this variator was provided by a spring. The traction coefficient was adjusted by changing a "lever force" (applied to a lever acting upon the variator rollers to control their position and providing, in the terms used in the introduction, the "traction force"). The lever force recorded in the drawing is the one which resulted in excessive slip within the variator—i.e., the one the force corresponding to the limiting traction coefficient. The scale on the left shows lever force. The scale on the right shows the corresponding traction coefficient. Data is provided for (a) polished roller and discs—powder metal or wrought steel—which showed some traction; (b) a polished disc and rougher powdered metal roller which showed better traction; and (c) a rough powdered metal roller and disc, showing the best traction. Roughness Test parts were also measured for roughness before and after product life tests that were conducted on the test rig using blended traction fluids. All test parts successfully completed a product life test of at least 500 hours.

The following surface properties were measured, using a Form Talysurf with micro-roughness filter with 2.5 micron cut-off and a 2CR-ISO filter with 0.08 mm cut-off:

(1) roughness average (Ra), a conventional measure of surface roughness, defined to be the arithmetic average of the absolute values of the roughness profile ordinates;

(2) root mean square roughness (Rq), obtained numerically from Ra;

(3) skewness (Rsk);

(4) reduced peak height (Rpk), the peak height measured after running in has removed the highest peaks;

(5) kernel roughness depth (Rk);

(6) trough depth (Rvk);

(7) material ratio (MR1) corresponding to the upper limit of the roughness core (Rpk);

(8) material ratio (MR2) corresponding to the lower limit of the roughness core.

The tables set forth below list the various roughness measurements of the tested races/discs and rollers before testing (TABLES 1 and 2) and at the estimated end of product life (500 hours of continuous operation) (TABLES 3 and 4). The tables do not limit the invention. The tables provide only an example of component performance. Other embodiments of the invention may show different properties.

TABLE 1

New Disc Contact Surface Roughness

| Ra | μm | 0.3 to 0.5 |
|---|---|---|
| Rq | μm | 0.3 to 0.6 |
| Rsk | μm | −0.8 to 0.8 |
| Rk | μm | 0.7 to 1.0 |
| Rpk | μm | 0.15 to 0.4 |
| Rvk | μm | 0.5 to 0.9 |
| MR1 | % | 5 to 10 |
| MR2 | % | 80 to 90 |

TABLE 2

New Roller Contact Surface Roughness

| Ra | μm | 0.1 to 0.25 |
|---|---|---|
| Rq | μm | 0.1 to 0.3 |
| Rsk | μm | −0.15 to 0.2 |
| Rk | μm | 0.3 to 0.6 |
| Rpk | μ.m | 0.13 to 0.3 |
| Rvk | μm | 0.05 to 0.02 |
| MR 1 | % | 10 to 19 |
| MR2 | % | 85 to 93 |

TABLE 3

Disc Surface Roughness at End of Product Life

| Ra | μm | >0.15 |
|---|---|---|
| Rq | μm | >0.2 |
| Rsk | μm | −1.2 to 0.8 |
| Rk | μm | 0.4 to 1.0 |

TABLE 3-continued

Disc Surface Roughness at End of Product Life

| Rpk | μm | 0.15 to 0.35 |
|---|---|---|
| Rvk | μm | 0.5 to 0.8 |
| MR1 | % | 7 to 10 |
| MR2 | % | 70 to 80 |

TABLE 4

Roller Surface Roughness at End of Product Life

| Ra | μm | 0.12 to 0.4 |
|---|---|---|
| Rq | μm | 0.15 to 0.5 |
| Rsk | μm | −0.5 to 0.8 |
| Rk | μm | 0.1 to 0.35 |
| Rpk | μm | 0.2 to 0.5 |
| Rvk | μm | 0.5 to 1.5 |
| MR 1 | % | 12 to 16 |
| MR2 | % | 70 to 85 |

Figure 4A:
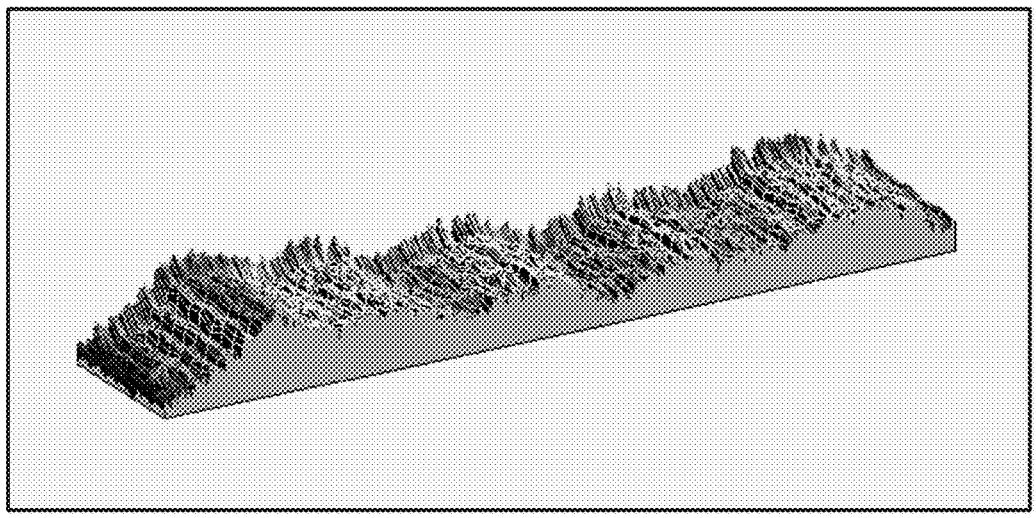
FIGS. 4A and 4B are surface profiles of a powder metal roller tested before and after use in an IVT that show surface roughness.
Figure 4B:
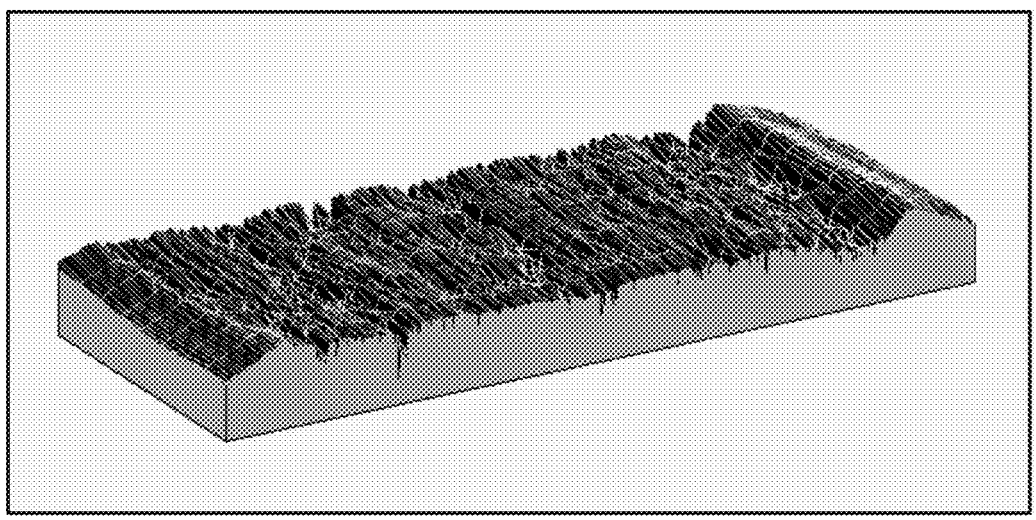
Figure 5A:
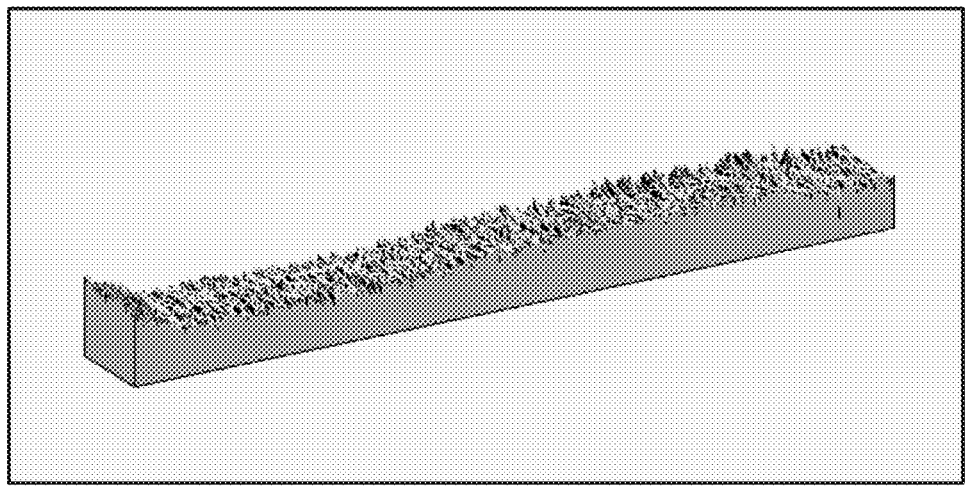
FIGS. 5A and 5B are surface profiles of a powder metal races/disc tested before and after use in an IVT that show surface roughness.
Figure 5B:
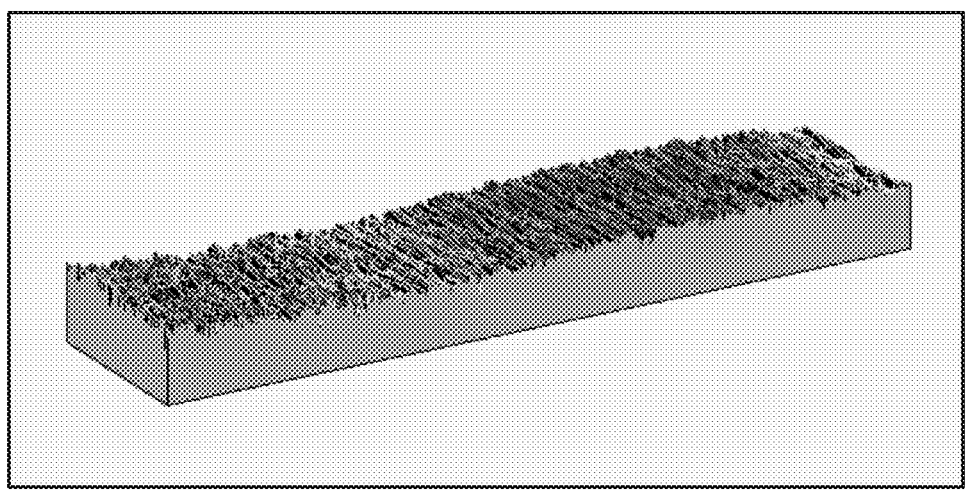
Figure 6:
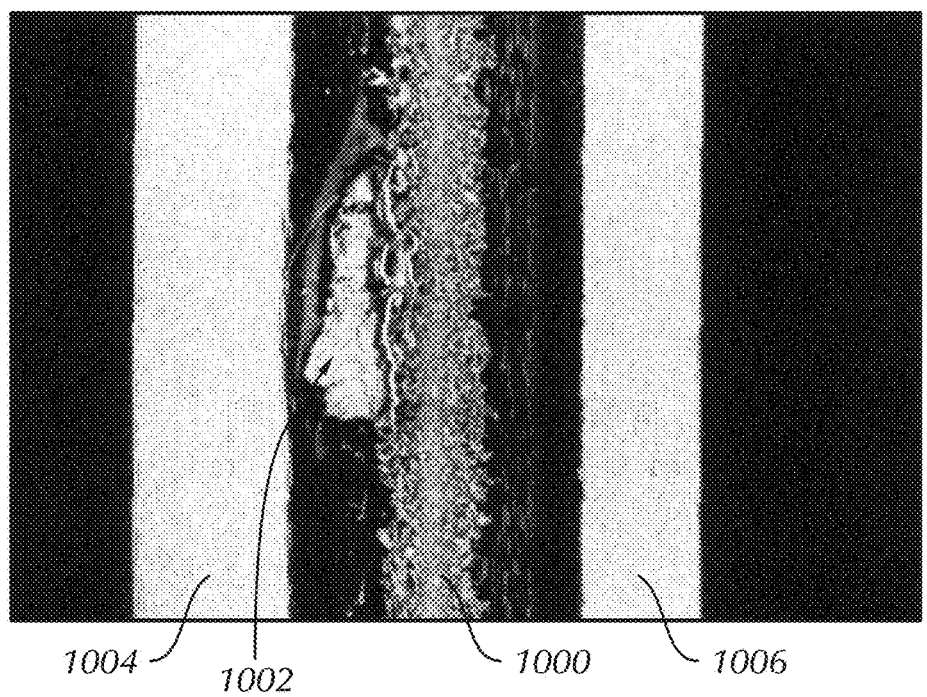
FIG. 6, which is prior art, is a micrograph showing the surface of a rough wrought steel variator part which has failed during testing.
Figure 7:
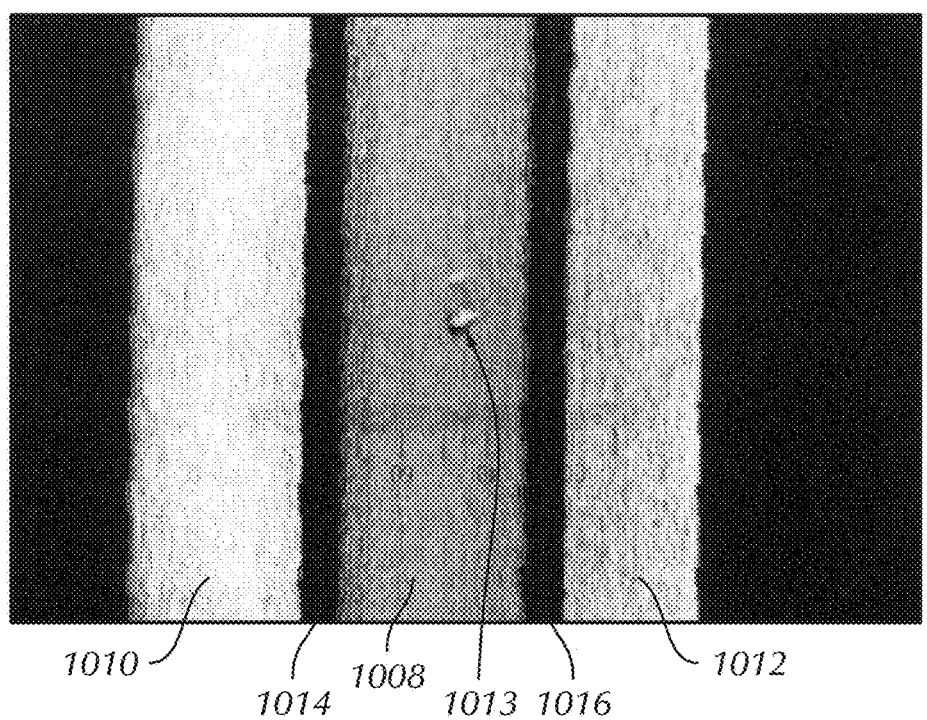
FIG. 7, which is prior art, is a micrograph showing the surface of a smooth wrought steel variator part which has survived prolonged testing.

The surface roughness profile of a new variator roller is illustrated in FIG. 4A. The surface profile illustrated in FIG. 4B is that of the same variator roller after the life test. Although the profiles are not identical, the profile of the used roller retains a degree of roughness and has not been polished smooth by use. Likewise, FIG. 5 shows the profiles of one of the discs as new (5A) and after testing (5B) and again a degree of roughness.

The tested races/discs and rollers had a roughness higher than conventional bearing steel races/discs and rollers both initially and at the end of the 500 hour life test. The surface roughness of the powder metal components is believed to be partly responsible for the improved traction.

The following factors can affect the surface roughness after use:
 a. relative hardness of the disc/races and the rollers
 b. density of the materials of these components
 c. initial surface texture/roughness
 d. porosity of the components.

It appears density should be sufficiently high to provide mechanical strength, thermal conductivity (to allow heat to be dissipated form the rolling contact), and high cycle spalling fatigue. Present results suggest that the rollers should preferably be no harder than those of the disc races. Acceptable test results have been achieved using variator races with hardness in the range of 56 to 61 HRc and rollers with hardness in the range of 54 to 60 HRc. Acceptable test results have also been achieved using roller material density between 7.0 and 7.6 g/cc, and it appears that density of 7.5 g/cc or better is favored.

The effects of a given degree of roughness may depend in some degree upon the thickness of the fluid film separating the rollers form the races. Film thickness is not constant, being dependent upon factors such as fluid temperature, end load, rolling speed, but knowing the expected operating envelope of the variator it is possible to make an estimate of the minimum film thickness expected during normal operation. Also the roughnesses of both components—roller and race—are relevant to performance.

We define the "composite roughness" of the parts as follows:

$$\sqrt{R_{q(race)}^2 + R_{q(roller)}^2}$$

where $R_{q(race)}$ is the root mean square roughness of the race and $R_{q(roller)}$ is the corresponding value for the roller. Then we define the specific film thickness as the minimum film thickness divided by the composite roughness. Specific film thickness gives an indication of whether the components make physical contact with each other. Conventional wrought steel variator components are typically run at a specific film thickness of 1.5 or more, so that little or no contact takes place between surface asperities on the rolling parts. However, performing the same calculation for the test parts shows that specific film thickness is 1.0 or less, implying that surface asperities do make physical contact.

Wear

Rates of wear for various powder metal variator rollers, measured at intervals during testing, are shown in the FIG. 8 graph. It appears that the rate of change of roller diameter can be expected to be greater than the rate of change of the dimensions of the races because wear on the races is spread over a much larger area. The wear rate of a conventional wrought steel part is also shown for comparison.

One group of test results seen in this graph showed excessively rapid wear, resulting from inadequate powder metal density. The other group, representative of suitable powder metal components, showed a wear rate which was acceptable in terms of the design life of the parts. However, the wear rate was greater than conventional wrought steel parts.

Volume of material removed by wear can be calculated using V=κWx where x is the sliding distance, W is the load on the contact, measured normal to it and κ is the dimensional wear coefficient. For smooth wrought steel variator parts which do not suffer surface distress, κ is approximately $2 \times 10^{-11}$ mm$^3$(Nm)$^{-1}$. For powder metal parts used in the trials, κ was approximately $1.5 \times 10^{-8}$ mm$^3$(Nm)$^{-4}$.

The test parts wore more than the bearing steel parts which are intended to undergo minimal wear. However, the wear did not render the powder metal test parts unacceptable. In some rough bearing steel components wear resulting from surface distress creates an irregular surface which produced vibration in the variator and can lead to surface initiated spalling causing the component to fail. The powder metal test parts have been found to wear in a manner which does not impair their function. Instead, wear of the test parts resulted in a surface which remained—on a sufficiently large measurement scale—regular, and which retained—on a smaller scale—a desirable degree of roughness. The surface is believed to be renewing itself as it wears, without being ruined by surface distress or being polished smooth. It is believed that wear takes place by the removal from the surface of microscopic particles which has been and will be referred "micropitting".

Surface roughness of the test parts was such that, had they been formed of wrought bearing steel, and in line with the prior test results mentioned above, spalling would have been expected. Surface distress and spalling have been observed in some powder metal parts. However in the majority of trials this did not occur and the longevity of the parts was acceptable. An assumption in the past has been that wear of the variator rollers and races is deleterious and is to be avoided. However, the powdered metal parts that wear in use appear to renew their running surfaces.

Traction properties of the test parts was acceptable and the 0.6% C-CR parts appeared to out perform bearing steel parts under certain traction fluid conditions.

With respect to the traction/variator film thickness discussion, conventional variator parts are made sufficiently smooth that they do not make physical contact in normal operation (except of course at start up, before the fluid film is established), while the test parts are sufficiently rough that contact between their asperities is to be expected.

Explanations of the reasons for the powdered metal component performance is not intended to limit the scope of the invention by reference to any particular theory in this regard. However it is believed that the powder metal components experienced micro-pitting instead of spalling and, as a result, the parts did not fail. It is also believed that propagation of surface initiated cracks which would have led to spalling was limited or eliminated resulting from the powder metal morphology. Small particles were lost from the component surface, but the larger cracks which would cause spalling did not develop. It is also believed that micro-pitting renews the running surfaces of the components to a certain extent to help sustain a level of surface roughness to improve the traction coefficient. See FIGS. 4 and 5.

It is also believed that the powder metal components morphology may enhance lubrication. See the explanation of FIGS. 3K-M in the Morphology section discussed above. It is believed that the traction fluid is distributed by the pressure gradient and/or capillary action in the contact region between the races/discs and rollers.

Traction Fluid

The traction tests described above suggest that specialized synthetic traction fluids are not necessary to maintain acceptable performance with powder metal components. Consequently the use of suitable powder metal components may enable use of less expense/more economical traction fluid. It may also provide for reduction in end load and consequent improvement in energy efficiency.

Component testing is still ongoing so it is difficult at this time to determine yet the actual cause of the improved performance of the powdered metal parts. Moreover, the discussion of the results is not intended to limit the scope of the invention by reference to any particular theory as to the reasons for the performance of the tested components.

What is claimed is:

1. A variator having at least one roller which runs upon at least one race to transfer drive from one to the other at variable ratio, the variator further comprising a fluid supply for supplying fluid to the race and roller thereby to provide a fluid film by which the roller and the race are separated in use, the roller having a running surface with root mean square roughness $R_{q(roller)}$ and the race having a root means square roughness $R_{q(race)}$, composite roughness being defined as $$\sqrt{R_{q(race)}^2 + R_{q(roller)}^2}$$

and the variator's specific film thickness being defined as the minimum thickness of the fluid film in normal operation divided by the composite roughness, the variator being characterised in that its specific film thickness is less than 1.0, and wherein at least one of the at least one roller and the at least one race comprises a powder metal surface with a Ra roughness above 0.1 micrometers.

* * * * *